US012763023B2

(12) United States Patent
Zhu et al.

(10) Patent No.: US 12,763,023 B2
(45) Date of Patent: Oct. 13, 2026

(54) DISPLAY PANEL AND DISPLAY DEVICE

(71) Applicant: HKC CORPORATION LIMITED, Shenzhen (CN)

(72) Inventors: Liangfeng Zhu, Shenzhen (CN); Lidan Ye, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 19/247,697

(22) Filed: Jun. 24, 2025

(65) Prior Publication Data

US 2026/0011307 A1 Jan. 8, 2026

(30) Foreign Application Priority Data

Jul. 2, 2024 (CN) ......................... 202410875595.9

(51) Int. Cl.
*G09G 3/3233* (2016.01)

(52) U.S. Cl.
CPC ... *G09G 3/3233* (2013.01); *G09G 2300/0842* (2013.01); *G09G 2320/0247* (2013.01); *G09G 2330/021* (2013.01); *G09G 2330/04* (2013.01)

(58) Field of Classification Search
CPC ......... G09G 3/3233; G09G 2300/0819; G09G 2320/0233; G09G 2300/0861
See application file for complete search history.

(56) References Cited

U.S. PATENT DOCUMENTS

2024/0087518 A1* 3/2024 He ........................ G09G 3/3266
2025/0006126 A1* 1/2025 Yuan ..................... G09G 3/3233
2025/0182688 A1* 6/2025 Zhang ................... G09G 3/3233

FOREIGN PATENT DOCUMENTS

| | | |
|---|---|---|
| CN | 102779479 | 11/2012 |
| CN | 103646629 | 3/2014 |
| CN | 105138168 | 12/2015 |
| CN | 108831375 | 11/2018 |
| CN | 111462699 | 7/2020 |
| TW | 200725560 | 7/2007 |

OTHER PUBLICATIONS

CN102779479A LED (light-emitting diode) display system Shuorui Zheng; Lixin Fan Nov. 14, 2012 (Year: 2012).*
CN103646629A Pixel drive device of AMOLED (Active Matrix Organic Light Emitting Display) He Jian; Su Junhai; Ke Xianjun; He Jiqiang Mar. 19, 2014 (Year: 2014).*
CNIPA, First Office Action for CN Application No. 202410875595.9, Aug. 7, 2024.

* cited by examiner

*Primary Examiner* — Van N Chow
(74) *Attorney, Agent, or Firm* — Hodgson Russ LLP

(57) ABSTRACT

A display panel includes a display driving circuit and display light-emitting units. The display driving circuit includes a first transistor, a data writing unit, a storage unit, and an inductor. The first end of the first transistor is directly or indirectly connected to a first power supply, and the second end of the first transistor is directly or indirectly connected to a second power supply. The control end of the first transistor is connected to a first node. The display light-emitting unit is connected in series with the first transistor between the first power supply and the second power supply. The storage unit is connected to the first power supply and the first node. The inductor is connected in series with the display light-emitting unit between the first power supply and the second power supply.

18 Claims, 2 Drawing Sheets

DISPLAY PANEL AND DISPLAY DEVICE

CROSS-REFERENCE TO RELATED APPLICATIONS

The present application claims priority to Chinese Patent Application No. 202410875595.9, filed on Jul. 2, 2024, the entire disclosure of which is hereby incorporated herein by reference.

TECHNICAL FIELD

The present application relates to the technical field of display, and particularly to a display panel and a display device.

BACKGROUND

Organic Light-Emitting Diode (OLED) display panels do not require a backlight source, and have advantages such as bendability, thin thickness, high brightness, low power consumption, fast response, and a wide color gamut, and thus are widely used in devices such as mobile phones and laptops.

The display driving circuit of the OLED includes a driving transistor, which is connected in series with the OLED. The driving mode of the OLED is current-driven. The signal of the data line controls the turn-on degree of the driving transistor. The greater the turn-on degree of the driving transistor, the larger the driving current flowing through the OLED, and the higher the brightness of the OLED.

A sudden change in the driving current will cause the brightness of the OLED to change unevenly and may even cause the OLED to flicker. In existing display driving circuits, a large number of transistors are added to construct a complex display driving circuit, which solves problems such as uneven brightness change and uneven brightness of different OLEDs, but such design makes the operation of the circuit extremely complex, increases the failure rate of the circuit, and raises the manufacturing cost of the display panel.

SUMMARY

There are provided a display panel and a display device according to embodiments of the present application. The technical solution is as below.

According to a first aspect of embodiments of the present application, there is provided a display panel, including a display driving circuit and a display light-emitting unit, where the display driving circuit includes:

- a first transistor, being a driving transistor, wherein a first end of the first transistor is directly or indirectly connected to a first power supply, and a second end of the first transistor is directly or indirectly connected to a second power supply, and a voltage of the first power supply is greater than a voltage of the second power supply, and a control end of the first transistor is connected to a first node, and the display light-emitting unit is connected in series with the first transistor between the first power supply and the second power supply;
- a data writing unit, connected to a data line, the first node, and a scan line, wherein the data writing unit writes a signal of the data line to the first node in response to a signal of the scan line;

- a storage unit, connected to the first power supply and the first node; and
- an inductor, connected in series with the display light-emitting unit between the first power supply and the second power supply.

According to a second aspect of embodiments of the present application, there is provided a display device, including:

the display panel;

a main board, connected to the display panel.

Other characteristics and advantages of the present application will become apparent through the following detailed description, or will be learned partially through the practice of the present application.

It should be understood that the above general description and the following detailed description are only exemplary and explanatory, and shall not limit the disclosure.

BRIEF DESCRIPTION OF THE DRAWINGS

The accompanying drawings here are incorporated into the specification and form a part of this specification, showing the embodiments that conform to the present application, and are used together with the specification to explain the principles of the present application. Obviously, the accompanying drawings in the following description are only some embodiments of the present application. For those skilled in the art, other accompanying drawings can be obtained based on these accompanying drawings without creative efforts.

DETAILED DESCRIPTION OF THE EMBODIMENTS

Now, the example embodiments will be described more comprehensively with reference to the accompanying drawings. However, the example embodiments can be implemented in various forms and should not be construed as being limited to the examples set forth herein. Instead, these embodiments are provided so that the present application will be more comprehensive and complete, and the concept of the example embodiments will be fully conveyed to those skilled in the art.

Moreover, the described features, structures, or characteristics can be combined in any suitable manner in one or more embodiments. In the following description, many specific details are provided to give a full understanding of the embodiments of the present application. However, those skilled in the art will realize that the technical solutions of the present application can be practiced without one or more of the specific details, or other methods, components, devices, steps, etc. can be adopted. In other cases, well-known methods, devices, implementations, or operations are not shown or described in detail to avoid obscuring various aspects of the present application.

Hereinafter, the present application will be further described in detail with reference to the accompanying drawings and specific embodiments. It should be noted here that the technical features involved in the various embodiments of the present application described below can be combined with each other as long as they do not conflict with each other. The embodiments described below with reference to the accompanying drawings are exemplary and are intended to explain the present application, and should not be construed as a limitation to the present application.

The First Embodiment

Figure 1:
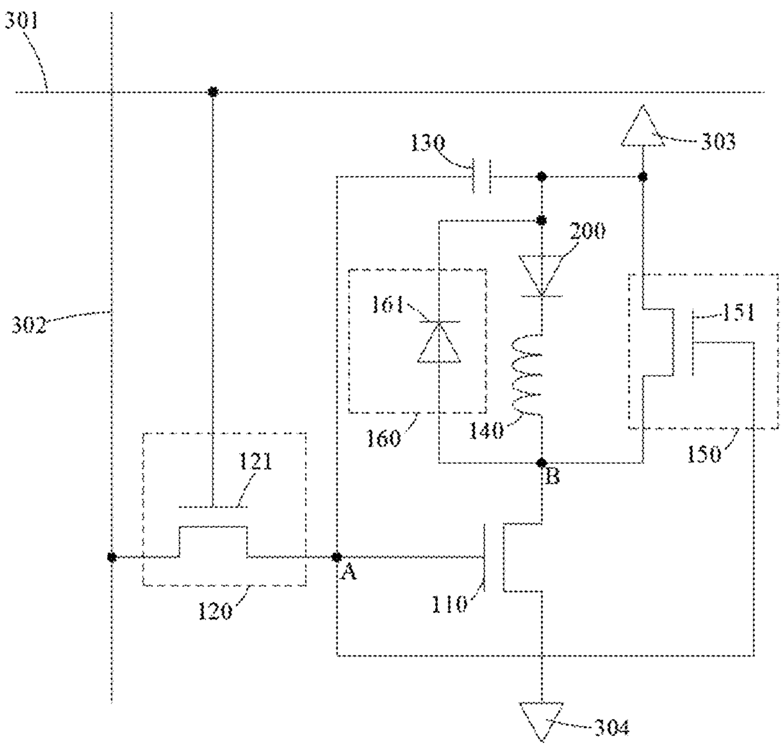
FIG. 1 is a schematic structural view of the display panel in the first embodiment of the present application.

Referring to FIG. 1, the display panel in this embodiment includes a display driving circuit and a display light-emitting unit 200. The display driving circuit includes a first transistor 110, a data writing unit 120, a storage unit 130, and an inductor 140. The first transistor 110 is a driving transistor. The first end of the first transistor 110 is directly or indirectly connected to a first power supply 303, and the second end of the first transistor 110 is directly or indirectly connected to a second power supply 304. The voltage of the first power supply 303 is Vdd, and the voltage of the second power supply 304 is Vss. The voltage Vdd of the first power supply 303 is greater than the voltage Vss of the second power supply 304. The control end of the first transistor 110 is connected to a first node A. The display light-emitting unit 200 is connected in series with the first transistor 110 between the first power supply 303 and the second power supply 304. The display light-emitting unit 200 includes an organic light-emitting diode.

The data writing unit 120 is connected to a data line 302, the first node A, and a scan line 301. The data writing unit 120 writes the signal (i.e., the data voltage) of the data line 302 to the first node A in response to the signal (i.e., the scan signal) of the scan line 301. The storage unit 130 is connected to the first power supply 303 and the first node A. The storage unit 130 is used to store charges, and the storage unit 130 includes a capacitor. The inductor 140 is connected in series with the display light-emitting unit 200 between the first power supply 303 and the second power supply 304.

When the display driving circuit is in operation: in the data writing stage, the scan line 301 inputs the scan signal. The data writing unit 120 writes the data voltage to the first node A in response to the signal of the scan line 301. The storage unit 130 starts to be charged. The data voltage and the threshold voltage of the first transistor 110 are written into the storage unit 130. The first transistor 110 is turned on, and the inductor 140 starts to be charged, and the current continues to increase. In the light-emitting stage, the data writing unit 120 stops writing the data voltage. The voltage of the storage unit 130 maintains the first transistor 110 be turned on. The first power supply 303 and the second power supply 304 are conducted through the display light-emitting unit 200 and the inductor 140, and the current flows through the display light-emitting unit 200, causing the display light-emitting unit 200 to emit light.

The inductor 140 has a significant delaying effect in the circuit. When the inductor 140 is powered on, due to the existence of the self-induced electromotive force, the change of the current will be hindered. Specifically, when the current increases, the direction of the induced current is opposite to that of the original current, resulting in a gradual increase of the current. When the current decreases, the direction of the induced current is opposite to that of the original current, resulting in a gradual decrease of the current. The inductor 140 is connected in series with the display light-emitting unit 200. When the display light-emitting unit 200 emits light, the current flowing through the display light-emitting unit 200 cannot change suddenly.

A sudden change in the current flowing through the display light-emitting unit 200 will cause the brightness of the display light-emitting unit 200 to change unevenly, and may even cause the display light-emitting unit 200 to flicker.

In this embodiment, the display panel includes a display driving circuit and a display light-emitting unit 200. The display driving circuit includes a first transistor 110, a data writing unit 120, a storage unit 130, and an inductor 140. The first transistor 110 is a driving transistor. The first end of the first transistor 110 is directly or indirectly connected to the first power supply 303, and the second end of the first transistor 110 is directly or indirectly connected to the second power supply 304. The control end of the first transistor 110 is connected to the first node A. The display light-emitting unit 200 is connected in series with the first transistor 110 between the first power supply 303 and the second power supply 304. The data writing unit 120 writes the signal of the data line 302 to the first node A in response to the signal of the scan line 301. The storage unit 130 is connected to the first power supply 303 and the first node A. The inductor 140 is connected in series with the display light-emitting unit 200 between the first power supply 303 and the second power supply 304. Since the inductor 140 is connected in series with the display light-emitting unit 200, when the display light-emitting unit 200 emits light, the current flowing through the display light-emitting unit 200 cannot change suddenly, which solves the problem of uneven brightness change of the display light-emitting unit 200.

Referring to FIG. 1, the first end of the first transistor 110 is connected to the first power supply 303 sequentially through a second node B and the display light-emitting unit 200. The inductor 140 is connected between the first power supply 303 and the second node B.

The display light-emitting unit 200 and the inductor 140 are connected between the first power supply 303 and the second node B, which can prevent the induced current of the inductor 140 from flowing directly to the second power supply 304 when the light-emitting stage ends.

Referring to FIG. 1, the inductor 140 is connected between the second node B and the display light-emitting unit 200. It should be noted that the inductor 140 can be connected between the second node B and the display light-emitting unit 200, but it is not limited to this. The inductor 140 can be connected between the first power supply 303 and the display light-emitting unit 200, depending on the specific situation.

The inductor 140 connects the second node B with the display light-emitting unit 200, which can prevent the inductor 140 from supplying power to light up the display light-emitting unit 200 when the power is cut off.

Referring to FIG. 1, the display driving circuit further includes a light-emitting control unit 150. The light-emitting control unit 150 is connected to the first power supply 303, the second node B, and a light-emitting control line. The light-emitting control unit 150 writes the voltage of the first power supply 303 to the second node B in response to the signal of the light-emitting control line.

At the end of the light-emitting stage, the light-emitting control unit 150 writes the voltage of the first power supply 303 to the second node B in response to the signal of the light-emitting control line, making the voltages at the display light-emitting unit 200 and the inductor 140 equal, to control the display light-emitting unit 200 to stop emitting light.

Referring to FIG. 1, the data writing unit 120 includes a second transistor 121. The first end of the second transistor 121 is connected to the data line 302, the second end of the second transistor 121 is connected to the first node A, and the control end of the second transistor 121 is connected to the scan line 301.

The light-emitting control unit 150 includes a third transistor 151. The control end of the third transistor 151 is connected to the light-emitting control line. The first end of the third transistor 151 is connected to the first power supply 303, and the second end of the third transistor 151 is connected to the second node B. The first transistor 110 is an N-channel thin-film transistor, the second transistor 121 is an N-channel thin-film transistor or a P-channel thin-film transistor, the third transistor 151 is a P-channel thin-film transistor, and the light-emitting control line is connected to the first node A.

When the display driving circuit is in operation: in the data writing stage, the scan line 301 inputs the scan signal. The second transistor 121 is turned on in response to the signal of the scan line 301. The data voltage is written to the first node A. The storage unit 130 starts to be charged. The data voltage and the threshold voltage of the first transistor 110 are written into the storage unit 130. The first transistor 110 is turned on, the inductor 140 starts to be charged, the current continues to increase, and the third transistor 151 is turned off. In the light-emitting stage, the signal of the scan line 301 controls the second transistor 121 to be turned off. The data writing unit 120 stops writing the data voltage. The voltage of the storage unit 130 maintains the first transistor 110 be turned on and the third transistor 151 be turned off. The first power supply 303 and the second power supply 304 are conducted through the display light-emitting unit 200 and the inductor 140, and the current flows through the display light-emitting unit 200, the display light-emitting unit 200 emits light. At the end of the light-emitting stage, the first transistor 110 is turned off and the third transistor 151 is turned on. The voltages at the display light-emitting unit 200 and the inductor 140 are equal, and the display light-emitting unit 200 stops emitting light.

The first transistor 110 and the third transistor 151 are transistors of different channel types. The third transistor 151 is controlled by the voltage of the first node A, one path of control signals can be reduced, which is beneficial to reducing the complexity of the display driving circuit and improving the reliability of the display driving circuit.

In some embodiments, the first transistor 110, the second transistor 121, and the third transistor 151 are all N-channel thin-film transistors. It should be noted that the first transistor 110, the second transistor 121, and the third transistor 151 can all be N-channel thin-film transistors, but it is not limited to this. The first transistor 110, the second transistor 121, and the third transistor 151 can also all be P-channel thin-film transistors, depending on the specific situation.

When the first transistor 110, the second transistor 121, and the third transistor 151 are transistors of the same channel type, the manufacturing cost of the display driving circuit and the display panel can be reduced.

Referring to FIG. 1, the display driving circuit further includes a protection unit 160. The protection unit 160 is connected to the first power supply 303 and the second node B, that is, the protection unit 160 is connected in parallel with the display light-emitting unit 200 and the inductor 140.

At the end of the light-emitting stage, the third transistor 151 is turned on to make the voltages at the display light-emitting unit 200 and the inductor 140 equal, that is, the inductor 140 is powered off. The protection unit 160 is connected in parallel with the display light-emitting unit 200 and the inductor 140. The protection unit 160 can eliminate the self-induced electromotive force generated when the inductor 140 is powered off, thereby protecting the display light-emitting unit 200 and the first transistor 110, which is beneficial to improving the service life of the display light-emitting unit 200 and the first transistor 110.

It should be noted that the protection unit 160 can be connected in parallel with the display light-emitting unit 200 and the inductor 140, but it is not limited to this. The protection unit 160 can also be connected in parallel with the inductor 140, depending on the specific situation.

Referring to FIG. 1, the protection unit 160 includes a diode 161. The anode of the diode 161 is connected to the second node B, and the cathode of the diode 161 is connected to the first power supply 303.

At the end of the light-emitting stage, the third transistor 151 is turned on to make the voltages at the display light-emitting unit 200 and the inductor 140 equal. The inductor 140 is powered off. Since the current of the inductor 140 cannot change suddenly, the induced current generated by the inductor 140 can be consumed through the diode 161, thereby protecting the display light-emitting unit 200 and the first transistor 110.

In the existing display driving circuits, a large number of transistors are added to construct complex display driving circuits, which solves problems such as uneven brightness change and uneven brightness of different organic light-emitting diodes, resulting in extremely complex operation of the circuit, increasing the failure rate of the circuit and raising the manufacturing cost of the display panel. In this embodiment, the display driving circuit uses three transistors, one capacitor, one inductor 140, and one diode 161, which reduces the complexity of the display driving circuit, improves the reliability of the display driving circuit, and reduces the manufacturing cost of the display panel.

The Second Embodiment

The main difference between the second embodiment and the first embodiment lies in the position of the display light-emitting unit 200.

Figure 2:
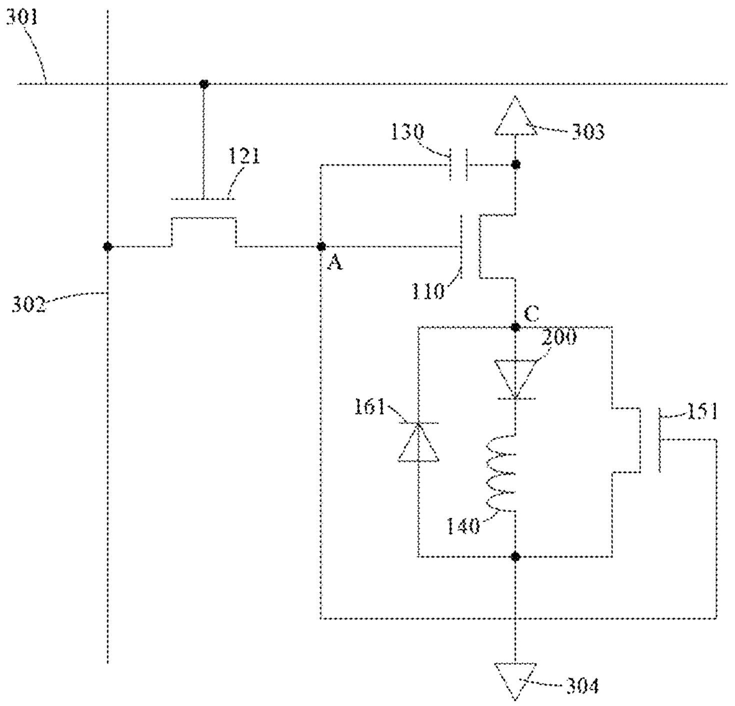
FIG. 2 is a schematic structural view of the display panel in the second embodiment of the present application.

Referring to FIG. 2, the second end of the first transistor 110 is connected to the second power supply 304 sequentially through a third node C and the display light-emitting unit 200. The inductor 140 is connected between the third node C and the second power supply 304.

The display light-emitting unit 200 and the inductor 140 are connected in series between the third node C and the second power supply 304, which does not affect the storage unit 130 storing the data voltage and the threshold voltage of the first transistor 110.

Referring to FIGS. 1 and 2, in the first embodiment, the display light-emitting unit 200 is connected in series between the second node B and the first power supply 303, and the inductor 140 is connected between the second node B and the display light-emitting unit 200. In this embodiment, when the display light-emitting unit 200 is connected in series between the third node C and the second power supply 304, the inductor 140 is connected between the display light-emitting unit 200 and the second power supply 304.

It should be noted that the inductor 140 can be connected to the display light-emitting unit 200 and the second power supply 304, but it is not limited to this. The inductor 140 can also be connected between the display light-emitting unit 200 and the third node C, depending on the specific situation.

The inductor 140 is connected to the display light-emitting unit 200 and the second power supply 304, which can prevent the inductor 140 from supplying power to light up the display light-emitting unit 200 when the power is cut off.

Referring to FIG. 2, the display light-emitting unit 200 is connected in series between the third node C and the second power supply 304. The light-emitting control unit 150 is connected to the third node C, the second power supply 304, and the light-emitting control line. The light-emitting control unit 150 writes the voltage of the second power supply 304 to the third node C in response to the signal of the light-emitting control line. The light-emitting control unit 150 includes a third transistor 151. The first end of the third transistor 151 is connected to the third node C, the second end of the third transistor 151 is connected to the second power supply 304, and the control end of the third transistor 151 is connected to the light-emitting control line.

When the first transistor 110 is an N-channel thin-film transistor and the third transistor 151 is a P-channel thin-film transistor, the light-emitting control line can be connected to the first node A. The third transistor 151 is controlled by the voltage of the first node A, one path of the control signal can be reduced, which is beneficial to reducing the complexity of the display driving circuit and improving the reliability of the display driving circuit. The first transistor 110, the second transistor 121, and the third transistor 151 can also all be N-channel thin-film transistors to reduce the manufacturing cost of the display driving circuit and the display panel.

Referring to FIGS. 1 and 2, in the first embodiment, the protection unit 160 is connected to the first power supply 303 and the second node B. In this embodiment, the protection unit 160 is connected to the third node C and the second power supply 304, that is, the protection unit 160 is connected in parallel with the display light-emitting unit 200 and the inductor 140. It should be noted that the protection unit 160 can be connected in parallel with the display light-emitting unit 200 and the inductor 140, but it is not limited to this. The protection unit 160 can also be connected in parallel with the inductor 140, depending on the specific situation. The protection unit 160 includes a diode 161. The anode of the diode 161 is connected to the second power supply 304, and the cathode of the diode 161 is connected to the third node C.

At the end of the light-emitting stage, the third transistor 151 is turned on to make the voltages at the display light-emitting unit 200 and the inductor 140 equal. The inductor 140 is powered off. Since the current of the inductor 140 cannot change suddenly, the induced current generated by the inductor 140 can be consumed by the diode 161, thereby protecting the display light-emitting unit 200 and the first transistor 110.

The Third Embodiment

Figure 3:
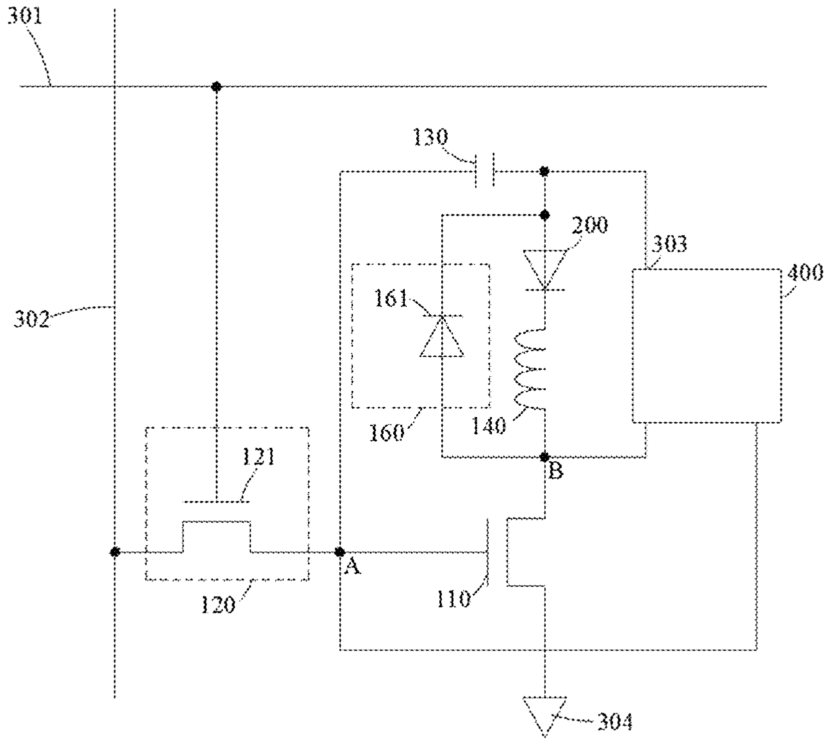
FIG. 3 is a schematic structural view of the display panel in the third embodiment of the present application.

Referring to FIG. 3, the display driving circuit in this embodiment includes a first transistor 110, a data writing unit 120, a storage unit 130, and an inductor 140. The arrangement of the first transistor 110, the data writing unit 120, the storage unit 130, and the inductor 140 is as shown in the first embodiment or the second embodiment.

The display panel further includes a light-emitting control chip 400, and the light-emitting control chip 400 can replace the light-emitting control unit 150 of the display driving circuit. When the display light-emitting unit 200 is connected in series between the second node B and the first power supply 303, the signal input end of the light-emitting control chip 400 is connected to the first node A, the signal collection end of the light-emitting control chip 400 is connected to the second node B, and the first power supply 303 is the power output end of the light-emitting control chip 400. The light-emitting control chip 400 can write the voltage of the first power supply 303 to the second node B through the signal collection end in response to the voltage of the first node A.

During the display stage (including the data writing stage and the light-emitting stage), the voltage of the power output end of the light-emitting control chip 400 is Vdd, and the power output end of the light-emitting control chip 400 serves as the first power supply 303. During the data writing stage and the light-emitting stage, the voltage of the first node A is at a high level, and the signal collection end collects the current and voltage of the second node B. At the end of the light-emitting stage, the voltage of the first node A is at a low level, and the light-emitting control chip 400 raises the voltage of the second node B to the voltage of the first power supply 303 through the signal collection end. The voltages at the display light-emitting unit 200 and the inductor 140 are equal, and the display light-emitting unit 200 stops emitting light.

It should be understood that when the display light-emitting unit 200 is connected in series between the third node C and the second power supply 304, the arrangement of the light-emitting control chip 400 is similar to that when the display light-emitting unit 200 is connected in series between the second node B and the first power supply 303, so it will not be described in detail here.

In some embodiments, the display panel further includes a current sampling unit. The current sampling unit is used to collect the current flowing through the second node B, and the signal collection end is connected to the current sampling unit, or the signal collection end is connected to the second node B, and the light-emitting control chip 400 has a built-in current sampling unit for collecting the current flowing through the second node B. The light-emitting control chip 400 can increase or decrease the voltage of the first power supply 303 according to the current flowing through the second node B.

By increasing or decreasing the voltage of the first power supply 303, the brightness of the display light-emitting unit 200 can be increased or decreased. For example, when the first transistor 110 ages and the brightness of the display light-emitting unit 200 decreases, appropriately increasing the voltage of the first power supply 303 can increase the brightness of the display light-emitting unit 200.

In addition, when the display driving circuit includes the protection unit 160, the current flowing through the second node B is collected through the signal collection end. When the leakage current of the first transistor 110 when it is turned off is greater than the preset value, the light-emitting control chip 400 can pull down the voltage of the power output end, and conduct the leakage current into the light-emitting control chip 400 through the protection unit 160. The light-emitting control chip 400 can release the current by a grounding resistor grounding floor. After the leakage current of the first transistor 110 when it is turned off decreases to below the preset value, the light-emitting control chip 400 can restore the voltage of the power output end to make the voltage of the power output end equal to the voltage of the second node B.

It should be noted that when the leakage current of the first transistor 110 when it is turned off is greater than the preset value, the current can be conducted into the light-emitting control chip 400 through the protection unit 160 and released by pulling down the voltage of the power output end, but it is not limited to this. The light-emitting control chip 400 can also turn on the first transistor 110 to release the current, depending on the specific situation.

By collecting the current flowing through the second node B through the signal collection end and detecting the magnitude of the leakage current, not only the large current can be released in a timely manner, and but also the loss situation of the display panel can be determined.

The Fourth Embodiment

Figure 4:
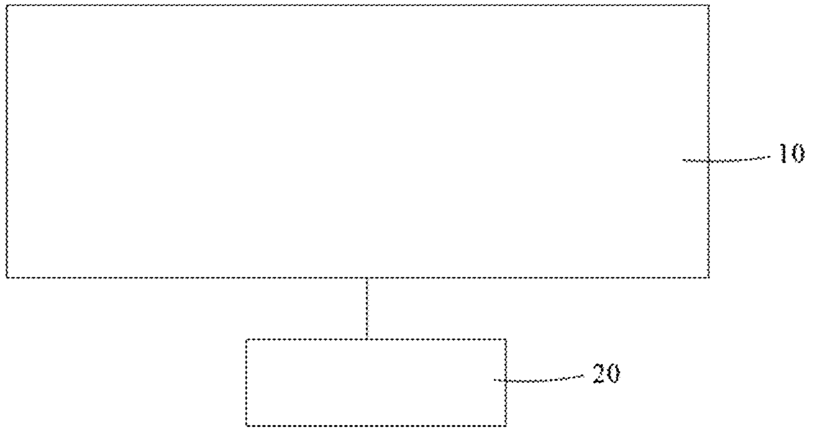
FIG. 4 is a schematic structural view of the display device in the fourth embodiment of the present application.

Referring to FIG. 4, the display device in this embodiment includes a display panel 10 and a main board 20, and the main board 20 is connected to the display panel 10. The display panel 10 includes the display panel 10 disclosed in the first embodiment and the third embodiment.

In this embodiment, the display device includes a display panel 10. The display panel 10 includes a display driving circuit and a display light-emitting unit 200. The display driving circuit includes a first transistor 110, a data writing unit 120, a storage unit 130, and an inductor 140. The first transistor 110 is a driving transistor. The first end of the first transistor 110 is directly or indirectly connected to the first power supply 303, and the second end of the first transistor 110 is directly or indirectly connected to the second power supply 304. The control end of the first transistor 110 is connected to the first node A. The display light-emitting unit 200 is connected in series with the first transistor 110 between the first power supply 303 and the second power supply 304. The data writing unit 120 writes the signal of the data line 302 to the first node A in response to the signal of the scan line 301. The storage unit 130 is connected to the first power supply 303 and the first node A. The inductor 140 is connected in series with the display light-emitting unit 200 between the first power supply 303 and the second power supply 304. Since the inductor 140 is connected in series with the display light-emitting unit 200, when the display light-emitting unit 200 emits light, the current flowing through the display light-emitting unit 200 cannot change suddenly, which solves the problem of uneven brightness change of the display light-emitting unit 200.

The terms "first", "second", etc. are only used for the purpose of description and cannot be understood as indicating or implying relative importance or implicitly specifying the number of indicated technical features. Thus, a feature defined with "first", "second", etc. may explicitly or implicitly include one or more of this feature. In the description of the present application, the meaning of "a plurality of" is two or more, unless otherwise specifically defined.

In the present application, unless otherwise clearly defined and limited, the terms "assembly", "connection", etc. should be understood in a broad sense. For example, it can be a fixed connection, a detachable connection, or an integrated body; it can be a mechanical connection or an electrical connection; it can be a direct connection or an indirect connection through an intermediate medium, and it can be the internal communication of two components or the interaction relationship between two components. For those skilled in the art, the specific meaning of the above terms in the present application can be understood according to the specific situation.

In the description of this specification, the description referring to the terms "some embodiments", "for example", etc. means that the specific features, structures, materials, or characteristics described in combination with the embodiment or example are included in at least one embodiment or example of the present application. In this specification, the schematic expressions of the above terms do not necessarily refer to the same embodiment or example. Moreover, the described specific features, structures, materials, or characteristics can be combined in a suitable way in any one or more embodiments or examples. In addition, without contradiction, those skilled in the art can combine and integrate the different embodiments or examples described in this specification and the features of different embodiments or examples.

Although the embodiments of the present application have been shown and described above, it can be understood that the above embodiments are exemplary and should not be construed as a limitation to the present application. Those skilled in the art can make changes, modifications, substitutions, and variations to the above embodiments within the scope of the present application. Therefore, any changes or modifications made according to the claims and the specification of the present application shall fall within the scope covered by the patent of the present application.

What is claimed is:

1. A display panel, comprising a display driving circuit and a display light-emitting element, wherein the display driving circuit comprises:

a first transistor, being a driving transistor, wherein a first end of the first transistor is directly or indirectly connected to a first power supply, and a second end of the first transistor is directly or indirectly connected to a second power supply, a voltage of the first power supply being greater than a voltage of the second power supply, wherein a control end of the first transistor is connected to a first node, and the display light-emitting element is connected in series with the first transistor between the first power supply and the second power supply;

a data writing unit, connected to a data line, the first node, and a scan line, wherein the data writing unit is configured to write a signal of the data line to the first node in response to a signal of the scan line;

a storage unit, connected to the first power supply and the first node; and an inductor, connected in series with the display light-emitting element between the first power supply and the second power supply.

2. The display panel according to claim 1, wherein the first end of the first transistor is connected to the first power supply sequentially through a second node and the display light-emitting element; or the second end of the first transistor is connected to the second power supply sequentially through a third node and the display light-emitting element.

3. The display panel according to claim 2, wherein when the display light-emitting element is connected in series between the second node and the first power supply, the inductor is connected between the second node and the display light-emitting element; and when the display light-emitting element is connected in series between the third node and the second power supply, the inductor is connected to the display light-emitting element and the second power supply.

4. The display panel according to claim 3, wherein the display driving circuit further comprises a light-emitting control unit, when the display light-emitting element is connected in series between the second node and the first power supply, the light-emitting control unit is connected to the first power supply, the second node, and a light-emitting control line;

the light-emitting control unit writes the voltage of the first power supply to the second node in response to a signal of the light-emitting control line;

when the display light-emitting element is connected in series between the third node and the second power supply, the light-emitting control unit is connected to the third node, the second power supply, and the light-emitting control line; and the light-emitting control unit writes the voltage of the second power supply to the third node in response to the signal of the light-emitting control line.

5. The display panel according to claim 4, wherein the data writing unit comprises a second transistor, a first end of the second transistor is connected to the data line, a second end of the second transistor is connected to the first node, and a control end of the second transistor is connected to the scan line;

wherein the light-emitting control unit comprises a third transistor, a control end of the third transistor is connected to the light-emitting control line, when the display light-emitting element is connected in series between the second node and the first power supply, a first end of the third transistor is connected to the first power supply, and a second end of the third transistor is connected to the second node;

when the display light-emitting element is connected in series between the third node and the second power supply, the first end of the third transistor is connected to the third node, and the second end of the third transistor is connected to the second power supply; and the first transistor, the second transistor, and the third transistor are all N-channel thin-film transistors.

6. The display panel according to claim 4, wherein the light-emitting control unit comprises a third transistor, a control end of the third transistor is connected to the light-emitting control line;

when the display light-emitting element is connected in series between the second node and the first power supply, a first end of the third transistor is connected to the first power supply, and a second end of the third transistor is connected to the second node;

when the display light-emitting element is connected in series between the third node and the second power supply, the first end of the third transistor is connected to the third node, and the second end of the third transistor is connected to the second power supply; and the first transistor is an N-channel thin-film transistor, the third transistor is a P-channel thin-film transistor, and the light-emitting control line is connected to the first node.

7. The display panel according to claim 2, wherein the display driving circuit further comprises a protection unit, when the display light-emitting element is connected in series between the second node and the first power supply, the protection unit is connected to the first power supply and the second node;

when the display light-emitting element is connected in series between the third node and the second power supply, the protection unit is connected to the third node and the second power supply, and the protection unit is at least configured to eliminate a self-induced electromotive force generated by the inductor when the inductor is powered off;

wherein the protection unit comprises a diode, when the display light-emitting element is connected in series between the second node and the first power supply, an anode of the diode is connected to the second node, and a cathode of the diode is connected to the first power supply; and when the display light-emitting element is connected in series between the third node and the second power supply, the anode of the diode is connected to the second power supply, and the cathode of the diode is connected to the third node.

8. The display panel according to claim 7, wherein the display light-emitting element is connected in series between the second node and the first power supply, the display panel further comprises a light-emitting control chip, a signal input end of the light-emitting control chip is connected to the first node, a signal collection end of the light-emitting control chip is connected to the second node, and the first power supply is a power output end of the light-emitting control chip, and the light-emitting control chip is capable of writing the voltage of the first power supply to the second node through the signal collection end in response to the voltage of the first node.

9. The display panel according to claim 8, wherein the display panel further comprises a current sampling unit, the current sampling unit is configured to sample a current flowing through the second node;

the signal collection end is connected to the current sampling unit, and the light-emitting control chip is capable of increasing or decreasing the voltage of the first power supply based on the current flowing through the second node.

10. A display device, comprising:

a display panel;

a main board, connected to the display panel;

wherein the display panel comprises a display driving circuit and a display light-emitting element;

wherein the display driving circuit comprises:

a first transistor, being a driving transistor, wherein a first end of the first transistor is directly or indirectly connected to a first power supply, and a second end of the first transistor is directly or indirectly connected to a second power supply, a voltage of the first power supply being greater than a voltage of the second power supply, wherein a control end of the first transistor is connected to a first node, and the display light-emitting element is connected in series with the first transistor between the first power supply and the second power supply;

a data writing unit, connected to a data line, the first node, and a scan line, wherein the data writing unit is configured to write a signal of the data line to the first node in response to a signal of the scan line;

a storage unit, connected to the first power supply and the first node; and an inductor, connected in series with the display light-emitting element between the first power supply and the second power supply.

11. The display device according to claim 10, wherein the first end of the first transistor is connected to the first power supply sequentially through a second node and the display light-emitting element; or the second end of the first transistor is connected to the second power supply sequentially through a third node and the display light-emitting element.

12. The display device according to claim 11, wherein when the display light-emitting element is connected in series between the second node and the first power supply, the inductor is connected between the second node and the display light-emitting element; and when the display light-emitting element is connected in series between the third node and the second power supply, the inductor is connected to the display light-emitting element and the second power supply.

13. The display device according to claim 12, wherein the display driving circuit further comprises a light-emitting control unit, when the display light-emitting element is connected in series between the second node and the first power supply, the light-emitting control unit is connected to the first power supply, the second node, and a light-emitting control line;

the light-emitting control unit writes the voltage of the first power supply to the second node in response to a signal of the light-emitting control line;

when the display light-emitting element is connected in series between the third node and the second power supply, the light-emitting control unit is connected to the third node, the second power supply, and the light-emitting control line; and the light-emitting control unit writes the voltage of the second power supply to the third node in response to the signal of the light-emitting control line.

14. The display device according to claim 13, wherein the data writing unit comprises a second transistor, a first end of the second transistor is connected to the data line, a second end of the second transistor is connected to the first node, and a control end of the second transistor is connected to the scan line;

wherein the light-emitting control unit comprises a third transistor, a control end of the third transistor is connected to the light-emitting control line, when the display light-emitting element is connected in series between the second node and the first power supply, a first end of the third transistor is connected to the first power supply, and a second end of the third transistor is connected to the second node;

when the display light-emitting element is connected in series between the third node and the second power supply, the first end of the third transistor is connected to the third node, and the second end of the third transistor is connected to the second power supply; and the first transistor, the second transistor, and the third transistor are all N-channel thin-film transistors.

15. The display device according to claim 13, wherein the light-emitting control unit comprises a third transistor, a control end of the third transistor is connected to the light-emitting control line;

when the display light-emitting element is connected in series between the second node and the first power supply, a first end of the third transistor is connected to the first power supply, and a second end of the third transistor is connected to the second node;

when the display light-emitting element is connected in series between the third node and the second power supply, the first end of the third transistor is connected to the third node, and the second end of the third transistor is connected to the second power supply; and the first transistor is an N-channel thin-film transistor, the third transistor is a P-channel thin-film transistor, and the light-emitting control line is connected to the first node.

16. The display device according to claim 11, wherein the display driving circuit further comprises a protection unit, when the display light-emitting element is connected in series between the second node and the first power supply, the protection unit is connected to the first power supply and the second node;

when the display light-emitting element is connected in series between the third node and the second power supply, the protection unit is connected to the third node and the second power supply, and the protection unit is at least configured to eliminate a self-induced electromotive force generated by the inductor when the inductor is powered off;

wherein the protection unit comprises a diode, when the display light-emitting element is connected in series between the second node and the first power supply, an anode of the diode is connected to the second node, and a cathode of the diode is connected to the first power supply; and when the display light-emitting element is connected in series between the third node and the second power supply, the anode of the diode is connected to the second power supply, and the cathode of the diode is connected to the third node.

17. The display device according to claim 16, wherein the display light-emitting element is connected in series between the second node and the first power supply, the display panel further comprises a light-emitting control chip, a signal input end of the light-emitting control chip is connected to the first node, a signal collection end of the light-emitting control chip is connected to the second node, and the first power supply is a power output end of the light-emitting control chip, and the light-emitting control chip is capable of writing the voltage of the first power supply to the second node through the signal collection end in response to the voltage of the first node.

18. The display device according to claim 17, wherein the display panel further comprises a current sampling unit, the current sampling unit is configured to sample a current flowing through the second node;

the signal collection end is connected to the current sampling unit, and the light-emitting control chip is capable of increasing or decreasing the voltage of the first power supply based on the current flowing through the second node.

* * * * *